May 7, 1940.   B. C. SKINNER   2,199,827
APPARATUS FOR RUBBING OR BRUSHING FRUIT AND THE LIKE
Filed Aug. 4, 1937   4 Sheets-Sheet 1

Fig. 1.

INVENTOR
BRONSON C. SKINNER
BY Roy F. Steward
ATTORNEY

May 7, 1940.  B. C. SKINNER  2,199,827
APPARATUS FOR RUBBING OR BRUSHING FRUIT AND THE LIKE
Filed Aug. 4, 1937   4 Sheets-Sheet 3

INVENTOR
BRONSON C. SKINNER
BY Roy F. Steward
ATTORNEY

Patented May 7, 1940

2,199,827

UNITED STATES PATENT OFFICE 2,199,827

APPARATUS FOR RUBBING OR BRUSHING FRUIT AND THE LIKE

Bronson C. Skinner, Dunedin, Fla., assignor to Brogdex Company, Winter Haven, Fla., a corporation of Florida Application August 4, 1937, Serial No. 157,389

11 Claims. (Cl. 146—202)

This invention relates generally to apparatus for rubbing or brushing fruit and the like; and it has to do particularly with apparatus in which fruit or other articles of generally globular shape may be subjected to frictional action while advancing through a supporting runway formed by members which extend transversely of the path of travel of the fruit through the machine, and some of which are rotatable. The apparatus is particularly useful in connection with the commercial preparation for market of fresh fruit and vegetables, such as oranges, lemons, grapefruit, apples, potatoes, tomatoes and the like, all of which may, for convenience, be generically referred to as "fruit."

The preparation of fresh fruit for market usually involves one or more operations in which the fruit is frictionally acted upon, i. e. rubbed or brushed, to an extent which depends upon the nature of the particular operation. Thus, such operations as washing or cleansing fruit to remove undesirable foreign matter, and polishing it to smooth and finish the surface (with or without the application of a protective coating), commonly involve rubbing or brushing, as may also drying the fruit to remove surface moisture after washing. For effecting such operations, one type of machine heretofore used to some extent comprises parallel rotatable cylindrical members, usually brush rolls, which rub, scrub or brush the fruit as it passes over such members transversely of their axes of rotation. Machines of this type have not heretofore been wholly satisfactory, especially as regards control of the rate and character of movement of the fruit over the brush rolls, and general efficiency and effectiveness of the brushing action.

Apparatus or machines heretofore employed in the attempt to secure some control over the rate of movement of the fruit (some of which machines involved the use of pushers, conveyors, "cleanouts," and the like) have been open to serious objection even when not utterly impractical, because such control as they achieved was only partial, or caused irregular feeding and crowding, bumping or other rough handling of the fruit, and in many cases resulted in machines of low capacity. A further difficulty experienced with prior machines has been that they did not operate to rub the fruit thoroughly enough or with the desired uniformity over its entire surface. In other words, some parts and some fruits were rubbed or brushed to a considerably greater extent than others, due either to the fact that no positive means was provided to give a definite rate of travel to each fruit or because, where such means was provided, it did not satisfactorily cooperate with other parts to accomplish the desired rubbing of the fruit. In other cases, where the results sought were more nearly approximated, the apparatus was often undesirably complicated mechanically.

An object of this invention is to provide apparatus for subjecting fruit to frictional action of the required vigor and thoroughness, which apparatus is free of the above noted objections, and operates to advance the fruit through the machine automatically, positively, expeditiously, and without injury, in such a way that all the fruit is frictionally acted upon effectively and substantially uniformly.

To these ends, provision is desirably made of a fruit-advancing runway comprising a series of rolls which rotate in fruit-advancing direction and a series of transfer members arranged in alternation with the rolls, the transfer members being cyclically operable to form fruit-supporting and brushing bights in cooperation with the rolls, to conduct the fruit between successive rolls, and to cooperate with the rolls in advancing the fruit over the rolls.

Each transfer member is capable of forming a fruit-supporting and brushing bight in cooperation either with the roll which precedes it or with the roll which follows it, and the transfer member does form such a bight with each of the rolls at different periods of its cycle. It is possible to secure a more vigorous and thorough brushing action, however, in the bight formed by a transfer member and the roll which precedes it than in the bight formed by the transfer member and the roll which follows it. At the former bight the rotation of the roll is into the bight, so that the roll assists gravity in pressing the fruit into the bight; at the latter bight rotation of the roll is out of the bight so that the roll opposes gravity and tends to reduce the pressure of the fruit against the bight walls.

It is accordingly an important feature of the present invention that the mechanism for cyclically operating the transfer members is organized and arranged to maintain each transfer member in cooperative bight-forming relation with the delivery side of the roll which precedes it throughout a major portion of the cycle of such member, and to cause the transfer of the fruit to the next similar bight to be effected as expeditiously as possible.

By operating the transfer members to bight-forming positions in which the bights are quite sharp, it is possible to secure a brushing action of such severity that soft or easily damaged fruit would be injured. Brushing of such severity is in some instances desirable, however, for treating firm, rough skinned fruit.

It is accordingly a further important feature of the invention that provision is made of means for enabling the effective operating strokes of the transfer members to be altered, and particularly for enabling the uppermost bight-forming positions of the transfer members to be altered, so that the sharpness of the bights formed between the transfer members and their respective preceding brush rolls in the principal brushing positions can be regulated in accordance with the character of the fruit to be operated upon.

It is the object of the invention to utilize the period of transit of the fruit through the apparatus as efficiently as possible, consistent with the orderly and regulated progress of the fruit through the apparatus.

To this end it is a feature that the transfer operations of the transfer members are made as brief as possible and that the cycles of the transfer members are so overlapped with relation to one another that fruit is caused to be advanced by one transfer member across the crest of a following roll to reach the following transfer member substantially as soon as the following transfer member is in position definitely to intercept and arrest the fruit.

Broadly considered, it is not necessary that the bight-forming members serve the functions of transferring the fruit from a bight to the following brush roll and of assisting the fruit over the following brush roll. From this point of view the invention may be considered to reside broadly in the combination with a succession of brush rolls, of means rotating the brush rolls in fruit-advancing direction, bight-forming members associated with the respective brush rolls and each cooperative with the delivery side of the associated brush roll to form a fruit-arresting and supporting bight, and means for operating the bight-forming members cyclically to withdraw them from their fruit-arresting positions periodically and in timed relation to one another to enable the fruit to be systematically advanced from bight to bight, the operating means being constructed and arranged to cause each bight-forming member to remain in bight-forming position throughout the major portion of its cycle.

Other objects and advantages will hereinafter appear.

In the accompanying drawings which show a preferred embodiment of the invention for illustrative purposes.

In the illustrated embodiment of the invention, the novel fruit-brushing apparatus comprises generally a plurality of rotatable cylindrical brushing members or brush rolls 1 and a plurality of transfer members or impellers 2. The transfer members 2 are oscillatable upwardly and downwardly. These members 1 and 2 form a fruit-supporting path or runway. Mechanism 3 is provided for driving the rotatable members in fruit-advancing direction, that is to say, so that the members travel at their upper sides from the introductory end of the apparatus toward the discharge or delivery end thereof. Separate and independent mechanism 4 is provided for driving or actuating the transfer members 2. All of the parts referred to are desirably compactly mounted on a suitable framework 5.

Various cooperative arrangements of the series of rotatable brush members or rolls 1 and oscillatable transfer members 2, which form the fruit-supporting path or runway, may be made, but in the illustrative example, these members are mounted crosswise of longitudinally extending side bars 6, 7 and 8 of the framework 5, the rolls 1 and the transfer members 2 being arranged in alternation and in parallel relation. When so desired, the transfer members 2, as well as the rolls 1, present brush surfaces.

The rotatable brush rolls 1 are not in contact with one another, but are spaced so far apart that fruit would fall through between them were this not prevented by the transfer members 2 which bridge the gaps or spaces between the rotatable brush rolls and receive the fruit from one brush roll and transfer it to the next succeeding brush roll in the line of travel of the fruit through the machine. In the illustrative apparatus, the transfer members 2 not only cooperate with the brush rolls 1 in supporting the fruit in the machine runway and in presenting brush surfaces which aid in rubbing the fruit, but, because they may be given an oscillatory or reciprocatory movement, they also provide means for positively controlling advance of the fruit through the machine, the fruit being lifted and positively urged forward as a transfer member moves from lowered toward raised position.

The means for mounting the brush rolls 1 may be of any suitable character. As illustrated each brush roll is secured to a tubular brush shaft 10. One end of each shaft 10 is rotatably supported by a bearing bracket 11 attached to the side rail 8 of the framework 5. The other end of each shaft 10 fits over a reduced end 12 of a stub shaft 13. The stub shaft 13 is rotatably mounted in a pair of spaced bearings 14 and 15 provided by a bearing block or casting 16. The bearing block 16 is removably secured to the side rails 6 and 7 of the framework 5. The two shafts 10 and 13 are connected together by a removable pin or key 17. The adjacent units or castings 16 are desirably removably secured to one another as well as to the frame. A sprocket wheel or pinion 18 is removably secured to each stub shaft 13 by means of a set screw 19 or similar fastening means, the sprocket wheel being mounted between the bearings 14 and 15 and between spaced walls 16ᵃ and 16ᵇ of the bearing block 16, whereby the stub shaft is removably secured against longitudinal movement. In the arrangement just described, the sprocket wheel 18 constitutes a driving member or connection for driving the shaft 10 and the brush 1 secured to the shaft. The side walls 16ᵃ and 16ᵇ constitute a housing for the sprocket wheel. This housing is provided with a removable cover member 16ᵈ.

The driving mechanism 3 for the brush rolls 1 is capable of driving the brush rolls at various selected speeds. In the illustrated apparatus, each sprocket wheel has two sets of teeth 18ᵃ and 18ᵇ whereby the sprocket wheels of adjacent brush rolls 1 can be connected together by sprocket chains 18ᶜ, one chain for each pair. Two drive sprocket wheels 18ᵈ are also mounted on two of the shafts 13, respectively, preferably midway between the ends of the runway. These sprocket wheels 18ᵈ are driven through a sprocket chain 20 from a sprocket wheel 21. The wheel 21 is driven by a change speed mechanism or by a speed regulator, indicated conventionally at 22. The change speed mechanism is driven by an electric motor 23 supported on the under framework of the machine. The brush rolls 1 may be driven at various selected speeds by suitably adjusting the speed regulator by means of the usual operating handle. Various speeds may be used as desired, depending somewhat on the size of the rotatable brushes. In a typical instance, brushes of six inch diameter may be employed, and the speed may be varied between about 148 R. P. M. and 296 R. P. M.

Figure 1:
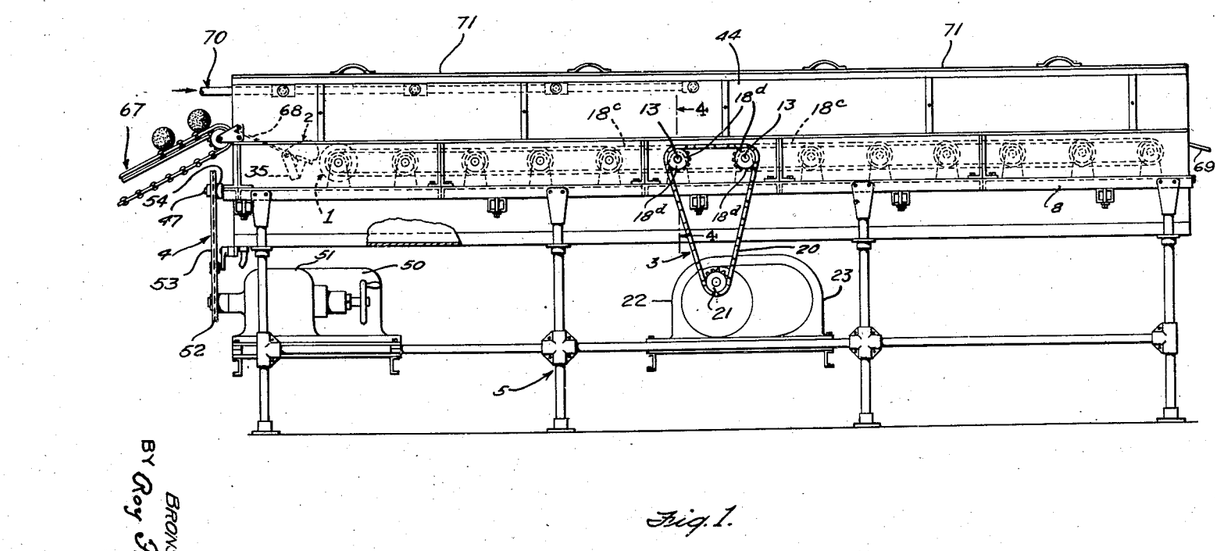
Figure 1 is a fragmentary side elevation of the apparatus partly broken away.
Figure 2:
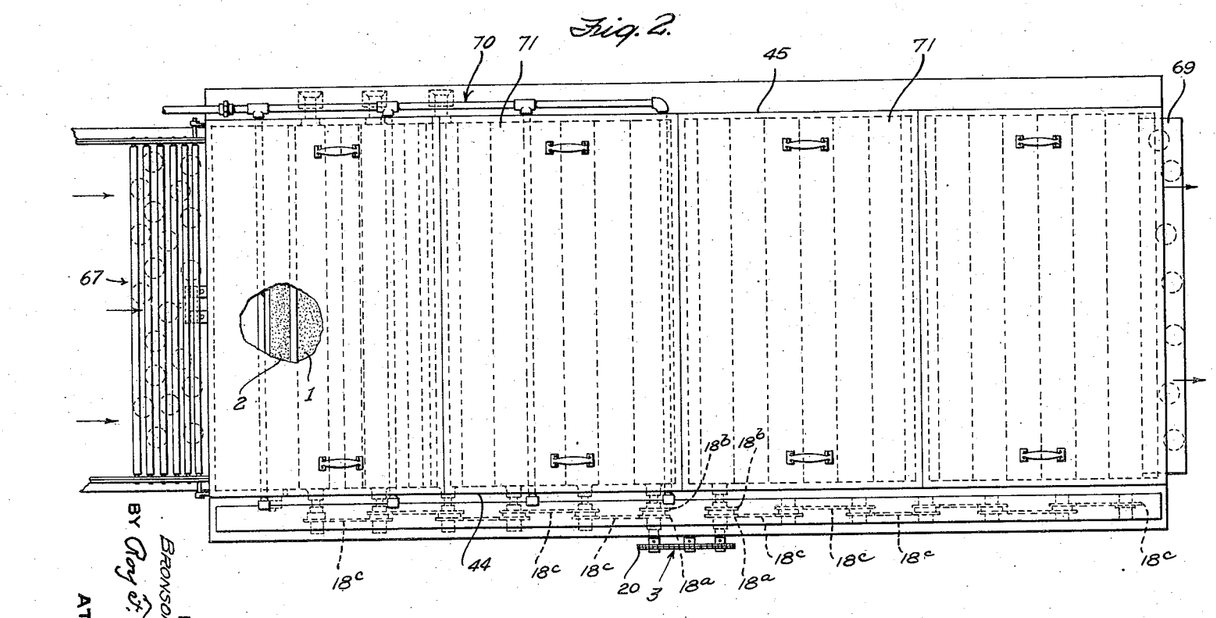
Figure 2 is a fragmentary plan view partly broken away of the apparatus illustrated in Figure 1.
Figure 3:
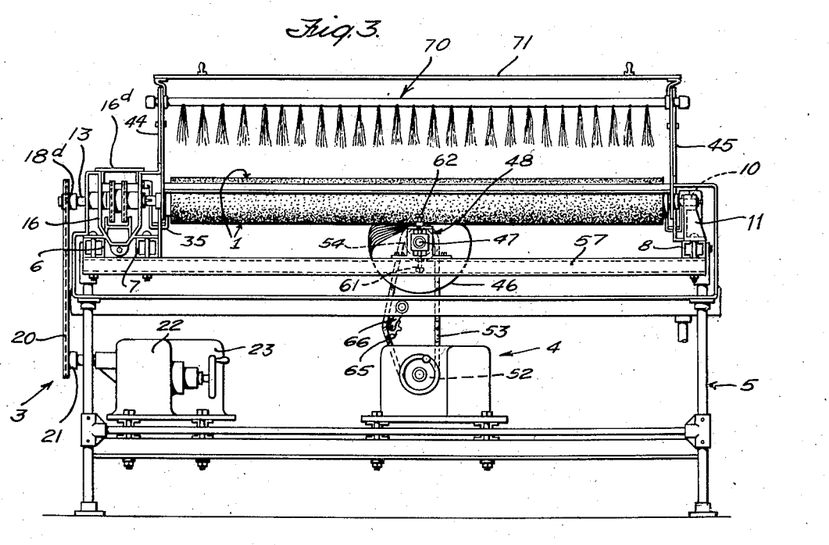
Figure 3 is a view in end elevation of the apparatus looking from the right in Figure 1.
Figure 4:
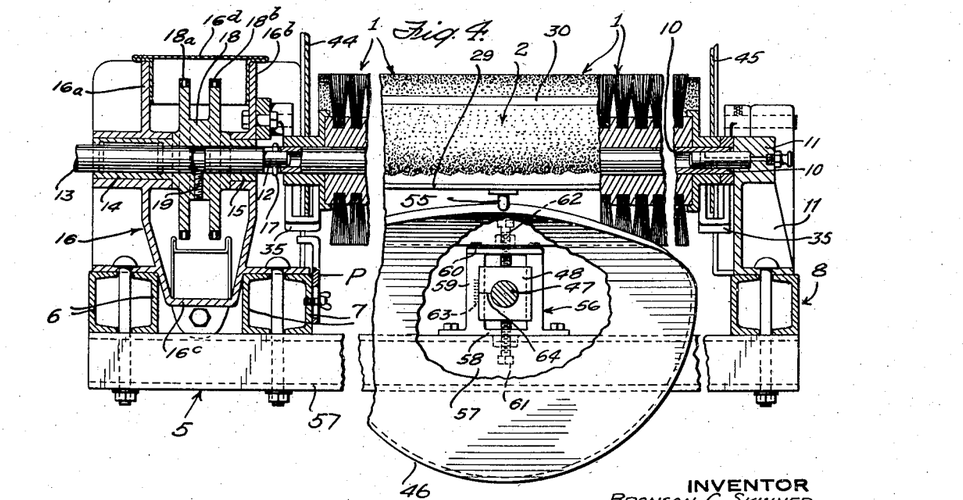
Figure 4 is an enlarged fragmentary cross-sectional view taken on the line 4—4 of Figure 1, looking in the direction of the arrows, a portion of the brush roll being broken away to show the next preceding transfer member.

From the description just given, it will be apparent that all the brush rolls 1 are driven in the same direction of rotation and at a speed which can be regulated within certain desired limits, the arrangement being such that the brushes are all driven clockwise (with their tops turning toward the right or delivery end of the machine), as viewed in Figure 1.

The specific construction and arrangement of the transfer brush members 2 may differ widely within the scope of the invention. In one embodiment illustrated in Figures 5 and 6, each transfer member comprises a frame 24 formed from one piece of sheet metal bent to provide two flat base portions 25 and 26 connected by a transverse portion 27 intermediate the edges 28 and 29. Adjacent the edge 28 is provided an angular or tapered portion 30 which terminates in an upright portion 31, the portions 27 and 31 cooperating to form an abutment for a wooden bar 32 which is secured to the base portion 26 of the frame 24. This bar, which is generally angular in cross-section, has a curved portion adjacent the edge 29 of the transfer member and is provided with bristles to provide a brush element having a substantially plane brush portion 33, and a curved or arcuate brush portion 34 adjacent edge 29. The bristles are all preferably beveled at 33ᵃ to provide an inclined portion which is in substantial alinement with, and forms a continuation of, the inclined portion 30 of the frame 24. The portion 30 tapers to the rear edge 28 of the transfer member. A relatively flat transfer member is thus provided, whose upper surface slopes downwardly away from the intermediate plane flat portion 33 toward both edges, as viewed in Fig. 6, the portion 30 providing a perfectly smooth strip which is free of bristles. This construction is advantageous because it enables the transfer member to operate very efficiently as a brushing member and as a member to control the advance of fruit, as will be pointed out more fully hereinafter.

Many different arrangements for mounting the oscillatable transfer members 2 may be used within the scope of the broad invention. In the present example means are provided for pivotally mounting the transfer members so that they can swing without interfering with the stationary side pieces or guards which form the sides of the runway. Each transfer member is pivotally supported at its ends so that its axis of pivoting and its edge adjacent thereto are closely adjacent the periphery of the next preceding brush roll. Thus, in the arrangement here shown, each transfer member is provided adjacent its end with a substantially U-shaped supporting bracket or holder 35 (see Figs. 4, 5, 6 and 7), the arms of which are arranged at an angle, one terminating in a laterally extending flat projection or plate 36 secured to the frame 24 of the transfer member, and the other in a laterally extending boss 37 provided with a bore 38. These bores are adapted to receive bearing or pivot pins 39 and 40, respectively. Pin 39 is carried by a bracket 41 adjustably secured to wall 16ᵇ of a bearing block or casting 16, while pin 40 is removably secured in bore 38 by a set screw or the like and fits in a bearing 42 carried by a bracket 43 supported on side rail 8 of framework 5. This arrangement makes it possible for the transfer members and their supporting holders or brackets 35 to pivot or swing without interfering with or hitting the longitudinally-extending side guard plates 44 and 45, which extend between the arms of the U-shaped supporting brackets or holders. Moreover, the transfer members can be readily fitted in place or removed by removing pin 40. The guard plates, which also form part of a housing to enclose the brushes, are attached to the framework adjacent the ends of the brushing rolls and transfer member, respectively, to keep the fruit from falling off the brushes or going far enough to either side of the machine to be injured by the moving parts. Each transfer member, which in the form and arrangement illustrated may be said to function as a lifter or impeller, is pivotally mounted in such manner and is so proportioned that, not only is its rear or pivoted edge 28 adjacent the periphery of the next preceding brush roll as already stated, but also the forward or free edge 29, even in its lowermost position, is sufficiently near the periphery of the next succeeding brush roll to prevent articles the machine is designed to handle from dropping through. In its uppermost position, the free edge 29 is still closer to the periphery of the succeeding brush roll. The rear edge is, most desirably, located on a level between the axis and the crest or summit of the next preceding brush roll, the arrangement being such that the transfer member receives oncoming fruit from the next preceding brush roll at a level substantially above the rotational axis thereof and delivers it against the next succeeding brush roll at a substantially lower level. The arc of swing is such that, in the lowermost position of the relatively flat transfer member, articles are supported jointly by it and the next succeeding rotatable brush roll at a level somewhat above that of the latter's axis of rotation; while in the uppermost position of said transfer member, articles are similarly supported at a level approximating that of the crest of said succeeding rotatable member. As the transfer member 2 is swung upward, the rounded forward end of the transfer member lifts the fruit substantially to the level of the crest of the following brush roll 1 and at the same time thrusts the fruit forward with a camming action. The fruit, thus thrust or thrown upward and forward, is readily carried over the crest of the following brush roll by frictional engagement with the forwardly rotating surface of the roll. The fruit, upon passing over the crest of the roll, is arrested by the next transfer member which, at that instant, is in fruit-intercepting position and is on the rise, i. e., on its way to assist the fruit supported between its forward end and the roll which follows it over the crest of the latter roll in the manner just described with reference to the preceding transfer member and brush roll.

After the fruit has been intercepted by a transfer member, the transfer member continues to rise rapidly until the transfer member reaches its uppermost position, the position in which it forms the very sharpest fruit-supporting and brushing bight in cooperation with the roll which precedes it. This is the most effective brushing position.

It is a feature of the present invention that the period in which the transfer member is caused to remain in or near this sharp bight-forming position is made as long as possible, whereas the other periods in the cycle of the transfer member are made as brief as possible. The fruit is subjected to some brushing even as the bight becomes quite obtuse, and it is also subjected to some brushing while it is supported in the trough or valley formed jointly by the transfer member and the following brush roll, but since the most effective brushing is produced between the transfer member and the preceding brush roll when the transfer member is in its uppermost position, the advantage of detaining the transfer member in that position is apparent.

The transfer members are desirably operated cyclically and also in timed relation to one another to cause the fruit to be alternately advanced and detained. The transfer members thus act positively to control the progression of the fruit through the machine step by step, and the rate of progression of the fruit along the runway is directly dependent upon the speed of operation of the transfer members. The transfer operating mechanism 4 is separately driven from the brush roll operating mechanism 3 and may be regulated as to speed so that the rate of progression of the fruit along the runway can be accurately controlled and determined independently of the rate of rotation of the brush rolls 1. Conversely, the rotational speed of the brush rolls can be varied without altering the rate of progression of the fruit along the runway.

The transfer members may be oscillated by any suitable mechanism, such for example, as cams which may be located as desired, each transfer member having suitable means for engaging its respective cam. In the embodiment particularly shown in Figs. 3 to 6, each transfer member is operated or lifted by a cam 46, which is adjustably secured to a cam shaft 47 by any suitable means such as a set screw 47ᵃ. The cam shaft 47 is mounted in bearings 48, and is continuously driven by the operating mechanism 4. The mechanism 4 comprises an electric motor 50 which, through a change speed mechanism or regulator, indicated conventionally at 51, drives a train comprising successively a sprocket wheel 52, a chain 53 and a sprocket 54, the last mentioned sprocket being fast on the cam shaft 47.

The speed regulator 51 enables the speed of operation of the transfer members to be selected as desired. In a typical instance the transfer members are operated at rates varying between 20 and 50 cycles per minute.

The shape and arrangement of the cams, while obviously susceptible of considerable variation, in practice should be such as to enable the bight-forming brushing period to be long and the transfer period to be short.

To this end, each cam is desirably provided with a concentric high portion (for maintaining the associated transfer member in its highest position) which extends through approximately 180 degrees. From one end of the high portion the cam face drops sharply to a low point and then at once rises sharply to merge with the other end of the high part. It is desirable that the forward portion of the transfer 2 be caused to follow accurately the contour of the cam so that the transfer member may be timed and operated in accordance with the timing for which the cam is designed. To this end it is a feature that the transfer member 2 has fixed upon it in the vertical plane of the cam shaft 47 a cam follower stem 55 which is of slight transverse dimensions and which extends downward for a substantial distance from the lower side of the transfer member 2 and terminates in a rounded end. With this arrangement a clearance is always provided between the cam surfaces and the lower face of the transfer member 2 so that the transfer member is constantly supported by engagement of the follower stem 55 with a point on the periphery of the cam which is in the vertical plane of the cam shaft 47, except when the cam shaft is lowered to a considerable extent, in which case the downward angular movement of the transfer member is stopped by a suitable stop device, for example, a pin, P, Fig. 7, carried by the frame.

It will be noted that as the transfer member rises and falls it swings about an axis located above and at right angles to the cam shaft 47. The forward end of the transfer member therefore has a component of movement in the direction of the length of the shaft 47 and also an angular movement relative to the cam. In accordance with one feature of the present invention, the cam 46, which is of plate-like construction, has its body deformed or displaced rearward in such manner that the cam periphery is conformed to the shifting of the follower 55 lengthwise of the shaft 47.

It is also a feature that the peripheral surface of the cam is sloped transversely in certain portions of its area, the slope being so chosen for each point that the cam surface presented to the follower stem 55 will constantly be substantially at right angles to the axis of the follower stem. In other words the effective part of the cam periphery bears a substantially uniform angular relation to the transfer member and to the follower stem at all times, the relation being such that the cam constantly exerts a direct thrust against the follower stem. As the cam shaft and cams are vertically adjustable, it is necessary that the cams, although relatively thin, shall have sufficient width to allow the respective follower stem to ride on the peripheral surface of its cam notwithstanding the relatively slight lateral displacement of the follower stem due to the difference in angle of its transfer member.

As has been pointed out, it is desirable to apply as vigorous a brushing action to the fruit as the fruit can reasonably stand, particularly if the fruit is rough-skinned or likely to be very dirty. By designing the apparatus to cause the brush in its uppermost position to form an acute bight a rather severe brushing action can be secured and one which is desirable for many fruits. If it is known that the fruit to be acted upon is soft or easily damaged, however, such a sharp bight may produce an effect which is too severe to be withstood. In such a case it is desirable to change the range of movement of the transfer member so as to cause it to produce a more open bight in its uppermost position. It is accordingly a feature of the present invention that provision is made for adjusting the operating strokes of the transfer members. This is desirably accomplished in the illustrative apparatus by making provision for lowering the cam shaft.

As has been stated, the cam shaft is supported in bearings 48. These bearings are mounted in carriers 56 which are supported in fixed positions upon cross rails 57 of the machine frame. Each carrier comprises a base 58, upright members 59, and a top plate 60 bolted to the upright members 59. The bearings 48 have grooves in their opposite vertical faces and are arranged to be slidably interfitted with the vertical members 59. Each bearing 48 is clamped between a set screw 61 threaded through the base 58 and a set screw 62 threaded through the top plate 60. The cam shaft can be lowered by backing out the set screw 61 and then turning the set screws 62 to cause the bearings to be firmly clamped in their lowered positions. During this readjusting movement, the bearings of course rest upon the set screws 61. The desired adjusted position can be gauged for each bearing by reference to a scale 63 provided upon one of the upright members 59 and a cooperating index mark 64 provided upon the bearing member. If the bearing is being raised, the set screw 62 will first be backed out at least far enough to permit of the desired adjustment, and the set screw 61 will then be turned. When the scale and index show that the desired adjustment has been effected, the set screw 62 will again be tightened against the bearing.

Readjustment of the cam shaft necessarily involves readjustment of the sprocket wheel 54 which is fast upon it. A chain tightener sprocket 65 is therefore desirably provided to take up slack in the chain 53. This sprocket is desirably carried by an arm 66 which is mounted upon a portion of the machine frame and spring pressed to urge the sprocket 65 against the chain.

Figure 5:
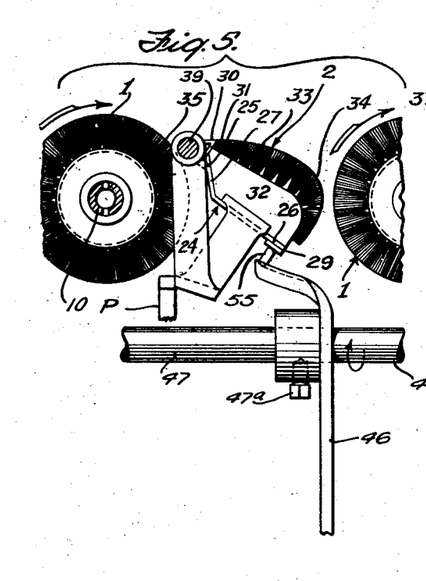
Figure 5 is an enlarged, fragmentary, cross-sectional view showing one of the transfer members in its lowest position.
Figure 6:
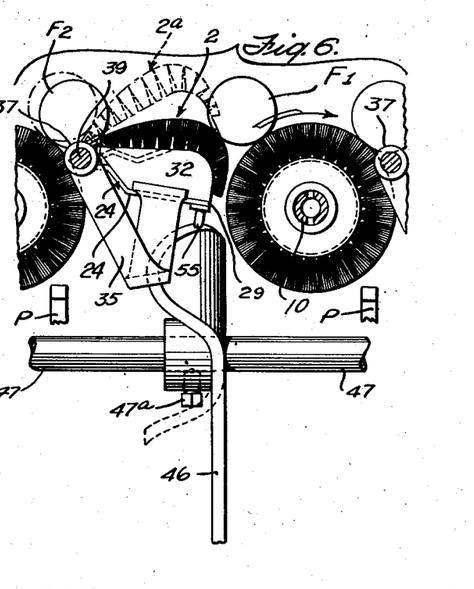
Figure 6 is a view similar to Figure 5 which particularly illustrates a transfer member in different operating positions.

The timing of the transfer members relative to one another is desirably chosen to cause a row of fruit to be delivered over the crest of a brush roll substantially as soon as the following transfer member has risen to a position in which it is capable of definitely intercepting and arresting the fruit. With the transfer members constructed and designed as illustrated herein, it has been found desirable to time the transfer member operating cams so that each cam leads by a few degrees the cam which follows it. To put this differently, each transfer member starts the fruit supported at its forward end over the crest of the following brush roll a little before the next following transfer member starts the fruit supported at its forward end over the brush roll which follows it. Thus the transfer member indicated by full lines in Figure 6 is shown as having just intercepted a fruit F² and as just about to throw a preceding fruit F' over the crest of the brush roll which follows it. After the fruit F² has been intercepted as shown in Figure 6, the transfer member 2 continues to rise to its extreme upper position like that illustrated in dot-and-dash lines at 2ᵃ in Fig. 6. The fruit F² remains in this bight until the transfer member has descended well toward its lowermost position, or in other words until the portion 30 of the transfer member has descended to a position a little below the horizontal. As the fruit rolls downward over the transfer member, the transfer member continues to descend to its lowermost position as illustrated in Fig. 5 and then rises to assist the fruit over the following brush roll when it reaches substantially the position shown in full lines in Figure 6.

The size of the fruit will have an influence upon the time required in transferring the fruit from one brushing bight to the next for the reason that a rising transfer member will cause a large fruit to start over the following brush roll earlier than it will cause a small fruit to do so. For small fruit, such as tangerines or small oranges, it is desirable to adjust the cams 46 so that each cam leads the cam which operates the next following transfer member by about 15 to 25 degrees of cam shaft travel. For large fruit, such as grapefruit, the advance may desirably be about 5 degrees, the exact amount depending in part upon the design of the cams and the adjustment of the cam shaft 47.

The fruit is desirably delivered to the machine a row at a time by means of a conveyor 67 which is operated in timed relation with the transfer members. The conveyor 67 deposits the fruit on to an inclined shelf or table 68 for delivering the fruit against the first transfer member. The fruit leaving the runway is delivered by the last brush roll on to an inclined shelf or table 69.

For washing purposes the machine is desirably provided with a sprayer system 70 comprising a main pipe and branch pipes, the branch pipes being adapted to project jets of cleaning fluid onto the fruit on the runway. Removable cover plates 71 are provided. The cover plates normally cover the runway but may be removed individually to gain access to the runway when desired.

While I have illustrated and described in detail a preferred form of my invention, it is to be understood that changes may be made therein and the invention embodied in other structures. I do not, therefore, desire to limit myself to the specific constructions illustrated, but intend to cover my invention broadly in whatever form its principle may be utilized.

While I have hereinbefore described the transfer member as having a brush portion, in many cases as good or even better results are obtained by making the body of the member with a smooth operating surface which may be covered with suitable protective material, such as canvas or rubber belt fabrics.

Figures 7, 8:
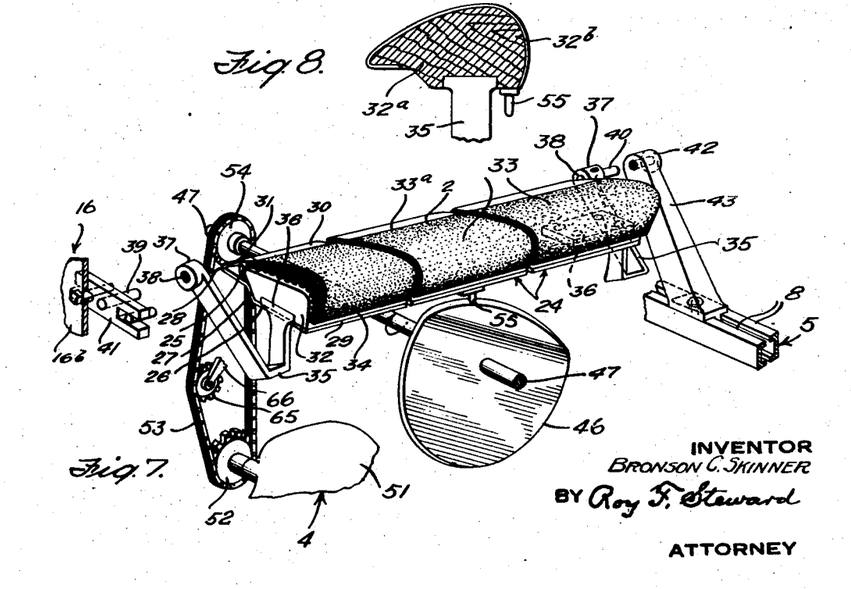
Figure 7 is an enlarged, fragmentary perspective view of one of the transfer members, together with a portion of the operating mechanism therefor.
Figure 8 is a detail end elevation of a modified form of transfer member.

Such a construction is illustrated diagrammatically in end elevation in Figure 8, wherein 32ᵃ indicates a bar or body of wood or metal having the desired configuration, and covered on its operative surface with a layer of cloth, rubber or other suitable padding material, indicated at 32ᵇ.

What is claimed is:

1. Apparatus for frictionally treating fruit and similar globular articles which comprises a series of spaced frictioning cylinders, each rotatable about a stationary axis, said cylinders being spaced apart so that a single fruit cannot make contact simultaneously with any two cylinders, means for rotating said cylinders in the same direction tending to advance the articles toward the discharge end of the apparatus, fruit transfer units bridging the space between successive cylinders, each unit comprising vertically oscillating non-rotating means for delivering fruit across the succeeding cylinder including a fruit-supporting table associated with the preceding cylinder and extending forwardly and upwardly from the advance face thereof in position to form with said face a fruit-supporting trough during delivery of fruit across the preceding cylinder and during a succeeding frictioning period, means supporting the table for tilting movement forwardly and downwardly into fruit-transferring register with the delivering means in lower position, and actuating means for cyclically shifting the delivering means and the table downwardly into transfer position and back to upper supporting and delivery position during a period not longer than the dwell of the delivering means and table in said upper position.

2. Apparatus as set forth in claim 1 in which the fruit-supporting table is provided with a relatively flat fruit-engaging upper surface.

3. Apparatus for frictionally treating fruit and similar globular articles which comprises a series of spaced frictioning cylinders, each rotatable about a stationary axis, said cylinders being spaced apart so that a single fruit cannot make contact simultaneously with any two cylinders, means for rotating said cylinders in the same direction tending to advance the articles toward the discharge end of the apparatus, fruit transfer units bridging the space between successive cylinders, each unit comprising vertically oscillating non-rotating means including a table for delivering fruit across the succeeding cylinder and extending forwardly and upwardly from the advance face thereof in position to form with said face a fruit-supporting trough during delivery of fruit across the preceding cylinder and during a succeeding frictioning period, means supporting the table for tilting movement downwardly and forwardly into fruit-transferring register with the delivering means in lower position, actuating means for cyclically shifting the delivering means and the table downwardly into transfer position and back into upper supporting and delivery position, and means for adjusting the angle of the table relative to said cylinder face in upper position to regulate the frictioning effect in said position.

4. Apparatus as set forth in claim 3 in which the table is provided with a relatively flat fruit-engaging upper surface.

5. Apparatus as set forth in claim 3 including means for adjusting the uppermost position of the actuating means arranged to vary the table angle in said position.

6. Apparatus as set forth in claim 3 in which the delivery means and the table are vertically movable relative to the actuating means, and stop means is provided for arresting said delivery means and table in predetermined lower position independently of the throw of the actuating means.

7. Apparatus for frictionally treating fruit and similar globular articles which comprises a series of spaced frictioning cylinders, fruit transfer units bridging the spaces between successive cylinders, each unit comprising vertically oscillating non-rotating means for delivering fruit across the succeeding cylinder including a fruit-supporting table associated with a preceding cylinder and extending forwardly and upwardly from the advance face thereof in position to form with said face a fruit-supporting trough during delivery of fruit across the preceding cylinder and during a succeeding frictioning period, means supporting the table for tilting movement forwardly and downwardly into fruit-transferring register with the delivering means in lower position, and actuating means for cyclically shifting the table downwardly into fruit-transferring position and back to upper supporting and delivery position, including a cam shaft extending longitudinally beneath the cylinders, cams on the shaft each extending between adjacent cylinders into association with a transfer unit, an offset cam follower on the lower side of each table having a component of movement parallel to the shaft during vertical oscillation of the table, and a narrow peripheral track on the associated cam deflected axially in register with said component arranged to maintain operative engagement with the follower.

8. Apparatus for frictionally treating fruit and similar globular articles which comprises a series of spaced frictioning cylinders, each rotatable about a stationary axis, said cylinders being spaced apart so that a single fruit cannot make contact simultaneously with any two cylinders, means for rotating said cylinders in the same direction tending to advance the articles toward the discharge end of the apparatus, fruit transfer units bridging the spaces between successive cylinders, each unit comprising vertically oscillating means for delivering fruit across the succeeding cylinder including a fruit supporting table associated with the preceding cylinder and extending forwardly and upwardly from the advance face thereof in position to form with said face a fruit-supporting trough during delivery of fruit across the preceding cylinder, means supporting the table for tilting movement forwardly and downwardly into fruit-transferring register with the delivery means in lower position, and actuating means for cyclically shifting the delivering means and the table downwardly into transfer position and back to upper supporting and delivery position, including a cam shaft extending along the series of cylinders, cams on the shaft operatively associated with the transfer units, and means for vertically adjusting the position of the cam shaft to vary the upward throw of the cams.

9. In an apparatus for treating articles of a general globular shape, such as certain fruit, the combination, with a series of rotatable article-rubbing rolls spaced apart so that a single article cannot make contact simultaneously with any two rolls, each roll being rotatable about a stationary axis, and means for simultaneously rotating all the rolls to move their upper surfaces in one article-advancing direction, of a series of reciprocatory transfer members, one for each space between two rolls, each transfer member having one end pivoted on an axis adjacent the discharge side of the periphery of its next preceding roll, said axis being substantially parallel to and above the rotational axis of said preceding roll, but below the topmost portion of the roll surface, each transfer member having an upper surface comprising two portions sloping downward away from each other from an intermediate line, one sloping toward the pivoted end of the transfer member to such an extent as to coact with a part of the advance face of said preceding roll to form an article-retaining trough when in a raised position and to allow the article to pass out of said trough when in a lowered position, the other portion sloping toward the free end of the transfer member and arranged to cooperate with the rear face of the next succeeding roll to elevate and discharge the article over said succeeding roll, and means for repeatedly reciprocating each transfer member from an upper position, where the incoming articles will be caught in the article-retaining trough, to a position where the articles will roll to the free end of the transfer member into contact with the rear face of the succeeding roll preparatory to discharge over said succeeding roll.

10. In an apparatus for treating articles of a general globular shape, such as certain fruit, the combination, with a series of rotatable article-rubbing rolls spaced apart so that a single article cannot make contact simultaneously with any two rolls, each roll being rotatable about a stationary axis, and means for simultaneously rotating all the rolls to move their upper surfaces in one article-advancing direction, of a series of reciprocatory transfer members, one for each space between two rolls, each transfer member having one end pivoted on an axis adjacent the discharge side of the periphery of its next preceding roll, said axis being substantially parallel to and above the rotational axis of said preceding roll, but below the topmost portion of the roll surface, each transfer member having an upper surface comprising two portions sloping downward away from each other from an intermediate line, one sloping toward the pivoted end of the transfer member to such an extent as to coact with a part of the advance face of said preceding roll to form an article-retaining trough when in a raised position and to allow the article to pass out of said trough when in a lowered position, the other portion sloping toward the free end of the transfer member and arranged to cooperate with the rear face of the next succeeding roll to elevate and discharge the article over said succeeding roll, means for repeatedly reciprocating each transfer member from an upper position, where the incoming articles will be caught in the article-retaining trough, to a position where the articles will roll to the free end of the transfer member into contact with the rear face of the succeeding roll preparatory to discharge over said succeeding roll, and means for varying the range of the reciprocatory movement of said transfer members.

11. In an apparatus for treating articles of a general globular shape, such as certain fruit, the combination, with a series of rotatable article-rubbing rolls spaced apart so that a single article cannot make contact simultaneously with any two rolls, each roll being rotatable about a stationary axis, and means for simultaneously rotating all the rolls to move their upper surfaces in one article-advancing direction, of a series of reciprocatory transfer members, one for each space between two rolls, each transfer member having one end pivoted on an axis adjacent the discharge side of the periphery of its next preceding roll, said axis being substantially parallel to and above the rotational axis of said preceding roll, but below the topmost portion of the roll surface, each transfer member having an upper surface comprising two portions sloping downward away from each other from an intermediate line, one sloping toward the pivoted end of the transfer member to such an extent as to coact with a part of the advance face of said preceding roll to form an article-retaining trough when in a raised position and to allow the article to pass out of said trough when in a lowered position, the other portion sloping toward the free end of the transfer member, and arranged to cooperate with the rear face of the next succeeding roll to elevate and discharge the article over said succeeding roll, and means for repeatedly reciprocating each transfer member at a variable speed from an upper position, where the incoming articles will be caught in the article-retaining trough, to a position where the articles will roll to the free end of the transfer member into contact with the rear face of the succeeding roll preparatory to discharge over said succeeding roll.

BRONSON C. SKINNER.